United States Patent [19]

Hovorka

[11] Patent Number: 4,843,268

[45] Date of Patent: Jun. 27, 1989

[54] ASYMMETRIC FIELD ELECTROMAGNETIC MOTOR

[75] Inventor: Jiri J. Hovorka, Tulsa, Okla.

[73] Assignee: Marketing Systems of the South, Inc., Tulsa, Okla.

[21] Appl. No.: 97,681

[22] Filed: Sep. 17, 1987

[51] Int. Cl.$^4$ ............................................. H02K 1/00
[52] U.S. Cl. ................... 310/181; 310/68 R; 310/112; 310/154; 310/156
[58] Field of Search ............... 310/152, 261, 154, 254, 310/155, 112, 156, 46, 68 R, 103, 256, 114, 42, 51, 177, 181, 179, 180; 318/254; 74/573

[56] References Cited

U.S. PATENT DOCUMENTS

| | | |
|---|---|---|
| 4,153,851 | 5/1979 | Hovorka. |
| 4,438,362 | 3/1984 | Brown ................................. 310/154 |
| 4,556,809 | 12/1985 | Beisse ................................. 310/156 |

FOREIGN PATENT DOCUMENTS

| | | |
|---|---|---|
| 0293918 | 8/1968 | Austria ........................ 310/181 UX |
| 2813701 | 10/1978 | Fed. Rep. of Germany ...... 310/181 |

*Primary Examiner*—R. Skudy
*Attorney, Agent, or Firm*—Staas & Halsey

[57] ABSTRACT

The present invention includes an electromagnetic motor having an asymmetric field stator. An aluminum rotor 6 includes a gorup 26 of permanent magnets that occupy a 153° segment of the rotor 6 and are counterbalanced mechanically by brass counterweights 28 on the other side of the rotor 6. An aluminum stator housing 42 includes a large segment 48 of permanent magnets 54 separated by an electromagnet segment 50 from a small segment 52 of permanent magnets 54. The large segment 48 subtends an angle of 122°, the small segment 52 an angle of 22°50′ and the electromagnets 43°. The permanent magnets 54 and electromagnets 56 and 58 of the staotr 42 produce a magnetic field that can have its center shifted from a first position or equator C by 32°25′ to a second position or second equator C′. As the rotor 6 spins the shifting of the center of the magnet field created by the stator 42 imparts momentum to the rotor 6 as it tries to align with the stator magnetic field. The momentum carries the rotor 6 around until the field can be shifted back to its original position C. A magnetic switch 66 controls the timing of the change in the current direction in the electromagnets 56 and 58 to shift the magnetic field at angles of 87°15′ and 119°40′ from the nearest in segment 48.

8 Claims, 6 Drawing Sheets

ASYMMETRIC FIELD ELECTROMAGNETIC MOTOR

BACKGROUND OF THE INVENTION

1. Field of the Invention

The present invention is directed to an asymmetrical field electromagnetic motor with a permanent magnet rotor having permanent magnets only on a segment of the rotor and a stator with an asymmetrical magnetic field that can be shifted and, more particularly, to a motor which provides rotational momentum by shifting the center or equator of a stator magnetic field created primarily by permanent magnets as the rotor rotates by reversing the polarity of stator electromagnets.

2. Description of the Related Art

Conventional electric motors powered by direct current have a stator including permanent magnets and a rotor coil in which the magnetic field can be rotated or a permanent magnet rotor with stator coils producing a rotating magnetic field. In some direct current motors both the stator and rotor are coils and no permanent magnets are provided. These conventional motors produce rotor rotation by changing the orientation of the field produced by the coils producing a force between the rotor and stator. In these conventional devices the coils completely surround the rotor shaft or are positioned on the entire inner circumference of the stator. These devices produce and utilize symmetrical magnetic fields. Because these devices require that current be circulated throughout the rotor and/or stator the conversion efficiency is low due to heating losses and inefficient utilization of the created magnetic field.

SUMMARY OF THE INVENTION

It is an object of the present invention to produce a motor which is more efficient, less expensive, low in thermal losses, simple to construct and which has very few parts which must be maintained.

It is another object of the present invention to produce a motor which uses the magnetic fields created by permanent magnets to produce a more efficient motor.

The above objects can be attained by an electromagnetic motor having an asymmetric field rotor. The rotor includes a group of permanent magnets that occupy only a segment of the rotor and are counterbalanced mechanically by counter weights on the other side of the rotor. The stator includes a large segment of permanent magnets separated by an electromagnet coil from a small segment of permanent magnets also creating an asymmetrical field. The permanent magnets and coils of the stator produce a magnetic field by opening or closing the magnetic circuit of the stator, resulting in a change in the center of the assymetrical field to a new or second equator. As the rotor spins the shifting of the center or equator of the magnet field created by the stator imparts momentum to the rotor as it tries to align with the stator magnetic field. The momentum carries the rotor around until the field can be shifted back to its original position to attract the rotor. A magnetic switch controls the timing of the change in the coil current direction to shift the magnetic field produced by the stator.

These together with other objects and advantages which will be subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention produces a rotor magnetic field with permanent magnets. The rotor field is attracted to a stator field created primarily by permanent magnets. If the position of the center of the stator field remained constant the rotor and stator would align in much the same way as a balanced scale aligns the weight bearing surfaces. The balance of the fields is tipped in a rotational direction by shifting the center of the stator field by changing the polarization of a stator electromagnet. The tipping of the stator field imparts rotational force to the rotor in the same way as extra weight on one side of a scale tips a weighing scale. The rotational force propels the rotor through a substantial portion of a rotation before the center of the stator field is returned to its original position.

Figure 1:
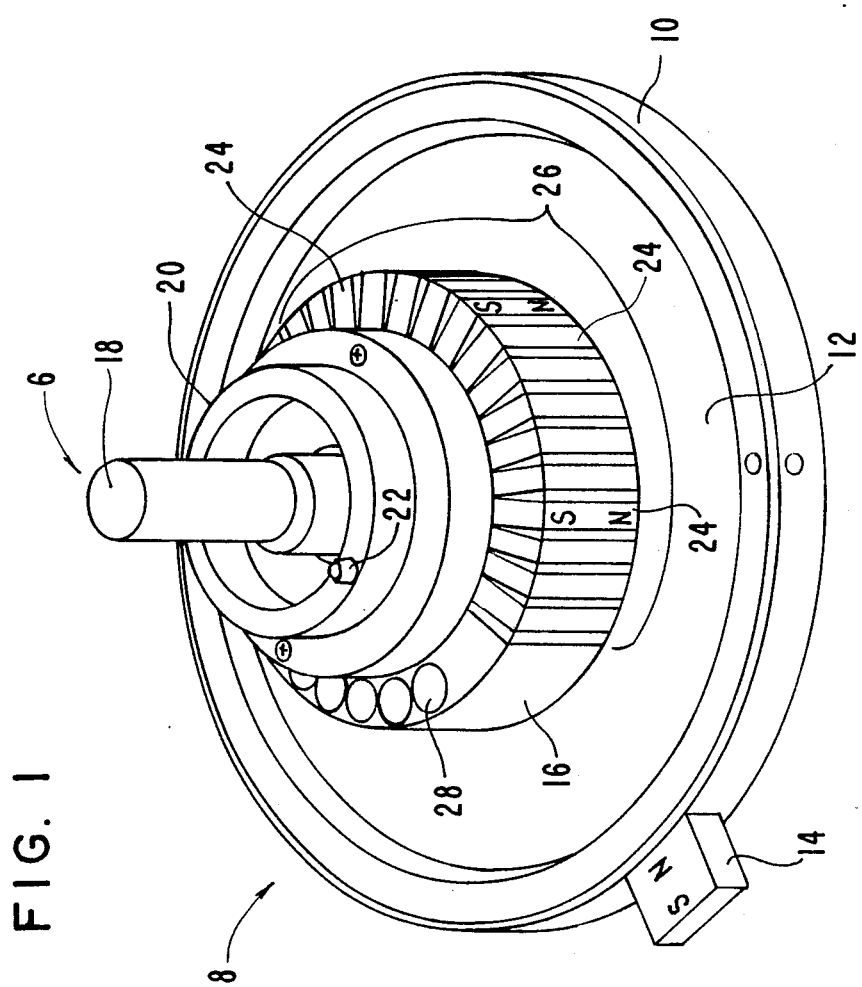
FIG. 1 depicts an end plate assembly 8 and rotor assembly 6 according to the present invention.

FIG. 1 depicts a rotor assembly 6 and an end plate assembly 8 of a motor in accordance with the present invention. The end plate assembly 8 includes a base plate 10 or housing made from a non-magnetic material such as an aluminum alloy. The base plate 10 has an end plate 12 fitted into the base plate 10. The end plate 12 is approximately 0.013 inches thick and comprises a material such as silicon-iron. The end plate 12 acts as a horizontal magnetic field deflector or deflector plate and is used to bend the magnetic fields of the stator and rotor back to the interior of the motor. The end plate 12 is polarized by a magnet 14 as illustrated in FIG. 1. The magnet 14 causes the deflector plate 12 to be divided into two sections with the section closest to the magnet having a north magnetic polarization.

The rotor assembly 6 includes a rotor cylinder 16 also produced from a non magnetic material such a aluminum. The rotor cylinder 16 includes an aluminum shaft 18 with ball bearings (not shown) and a coupler 20 with a coupler pin 22 for coupling a rotor assembly 6 in one segment of a plural segment motor to a rotor assembly 6 in another segment. The bottom of the rotor (not shown) has a hole which matches the pin 22 shown in FIG. 1. The shaft 18 rotates in the base plate 10 on conventional low friction ball bearings.

On one side of the rotor cylinder 16 permanent magnets 24 are mounted in the cylinder 16. The magnets have a magnetic field orientation as illustrated in FIG. 1. The magnets 24 are mechanically counterbalanced by brass counterweights 28 inserted in holes in the rotor cylinder 16. The magnets 24 are grouped together in a rotor segment 26 which occupies a segment of 153° of the rotor circumference. The magnets 24 are preferably made of a rare earth material such as samarium cobalt. The rotor magnets 24 create a total magnetic flux of 26,275 Gauss in a seven inch diameter motor using non-rare earth magnets. The rotor magnets in larger motors and motors using rare-earth or other types of magnets should produce 69.299% of the total flux produced by the rotor and stator permanent magnets.

Figure 2:
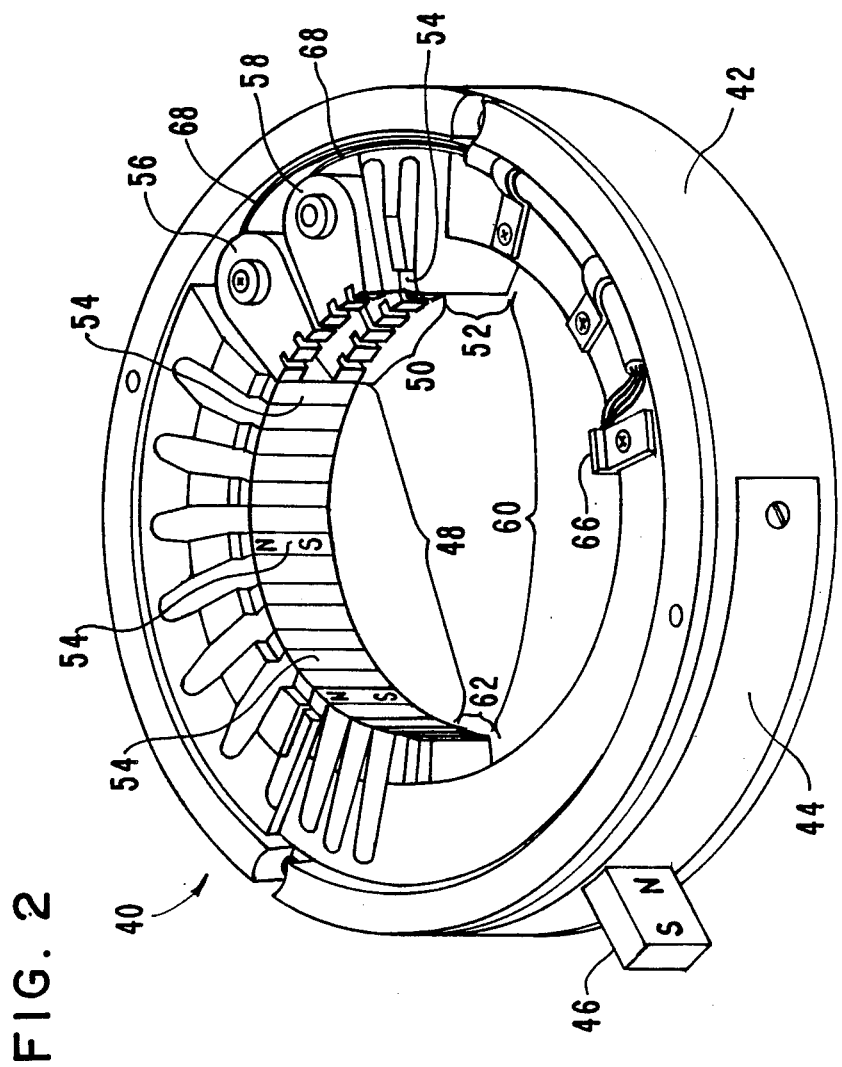
FIG. 2 illustrates a stator assembly 40 according to the present invention.

FIG. 2 illustrates a stator assembly 40 for the rotor assembly 6 and end plate assembly 8 of FIG. 1. The stator assembly 40 includes a stator housing 42 made of a non-magnetic material such a aluminum. On the outside of the stator housing 42 is a vertical magnetic deflector 44 made from a material such as silicon-iron. The deflector 44 is 0.013 inches thick and occupies 180° of the exterior of the stator housing 42 with the visible edge of the deflector 44 positioned 87°15' past the end of segment 48. The deflector 44 is biased by a polarizing magnet 46 with a magnetic orientation as illustrated in FIG. 2.

The stator is divided into four segments 48, 50, 52 and 60. The first segment 48 includes permanent magnets 54 which fit into the housing 42. The magnets 54 are again of a rare-earth material such as samarium cobalt that has a high field strength. The segment 48 occupies 122° of the inner circumference of the stator assembly 40. The abutting second segment 50 includes two direct current coils 56 and 58 creating a pair of electromagnets. Of course the pair of electromagnets 56 and 58 could be a single electromagnet. The electromagnets 56 and 58 allow the magnetic orientation of segment 50 to be changed. The second segment 50 occupies 43° of the inner circumference of the stator assembly 40. The abutting third segment 52 includes additional permanent magnets 54 creating a segment of width 22°50'. The entire magnetic assembly including segments 48–52 occupies 186°50' of the inner circumference of the stator assembly 40. The last segment 60 of the stator does not include any permanent magnets or coils and no magnetic field is by this portion of the stator assembly 40. The permanent magnets 54 of the stator in a seven inch motor produce a flux of 11,640 Gauss with non-rare earth magnets, which is 11,460/(11,640+26,275)=30.7% of the total flux produced by the rotor and stator permanent magnets, while the electromagnetic coils 56 and 58 produce an alternating flux of 900 Gauss in such a seven inch diameter motor. In different size motors the flux produced by the coils should be 2.373% of the total flux produced by the rotor and stator permanent magnets. A flux terminator 62 is provided on one end of the magnet segment 48. The terminator 62 prevents flux created by segment 48 from materially attracting the rotor magnets 24 afer they have passed the terminator 62. The switching of the electromagnets or electromagnetic coils 56 and 58 from one magnetic orientation to another magnetic orientation is controlled by a magnetic cycle switch 66 which can be a Hall effect switch located 87°15' past segment 48 in the counter clockwise direction. Connections to an outside power supply through the Hall switch 66 and conductors 68 provide power to the electromagnetic coils 56 and 58.

Figure 3:
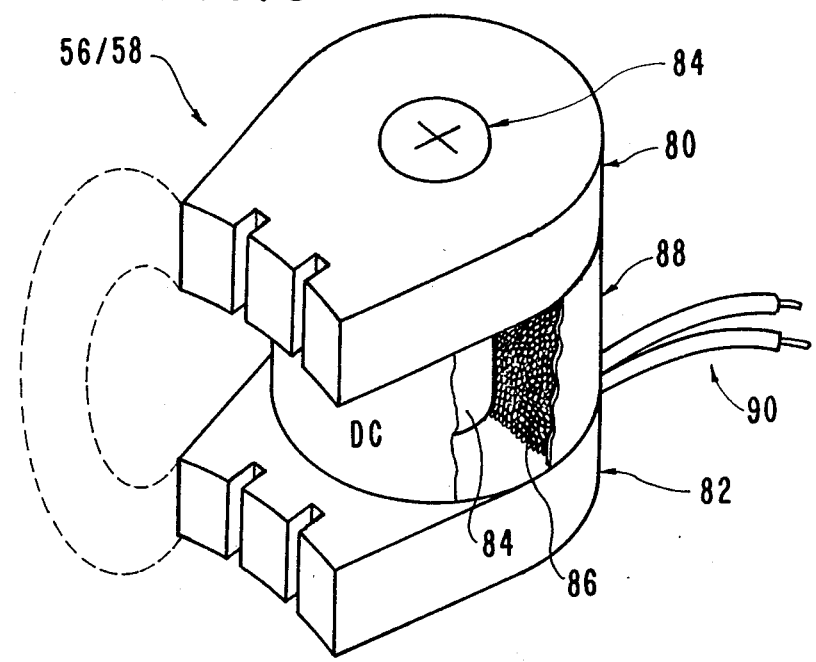
FIG. 3 is a detailed diagram of a coil 56/58 of FIG. 2.

FIG. 3 illustrates one of the electromagnetic coils 56/58 in greater detail. An upper pole plate 80 is connected to a lower pole plate 82 by a center core 84. The plates 80 and 82 and core 84 are preferably made from a material such as silicon iron or pure iron. A magnet wire coil 86 surrounds the core 84 and includes insulated conductors. The exterior of the coil is surrounded by an insulating layer 88. Leads 90 are connected to the timing device and switch 66.

Figure 4:
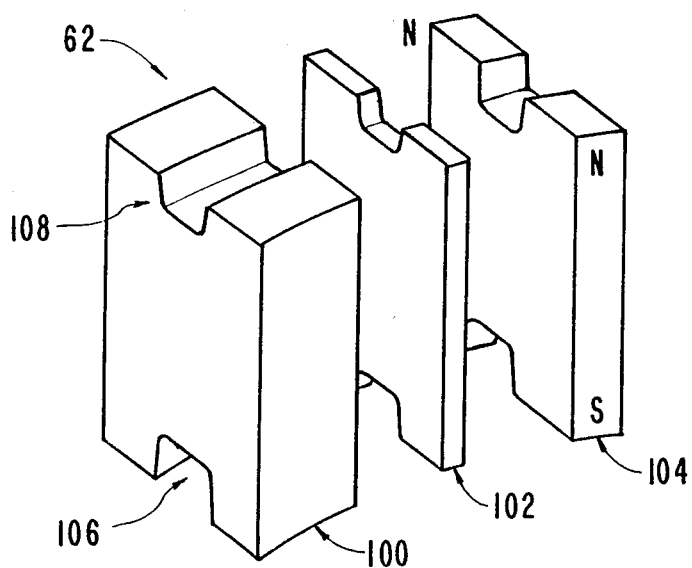
FIG. 4 depicts the details of the flux terminal 62 of FIG. 2.

The details of the flux terminator 62 are illustrated in FIG. 4. The terminator 62 includes a load section 100 adjacent a silicon iron plate 102 approximately 0.30 inches thick. Adjacent the plate 102 is a low flux permanent magnet 104. The magnetic polarization of the magnet 104 is opposite the magnets in segment 48 (FIG. 2) tending to repel the field of the rotor magnets 24 after they pass the terminator and the field produced by stator segment 48 (FIG. 2). The magnet 104 is positioned farthest away from the segment 48. A flux terminator 62 can also be positioned adjacent the last magnet 24 in the counterclockwise direction of the rotor. The flux terminator assembly 62 as well as the magnets 24, 54 and 104 mounted in the stator assembly 40 and rotor assembly 6 include notches 106 and 108 which help hold the magnets in place.

Figure 5:
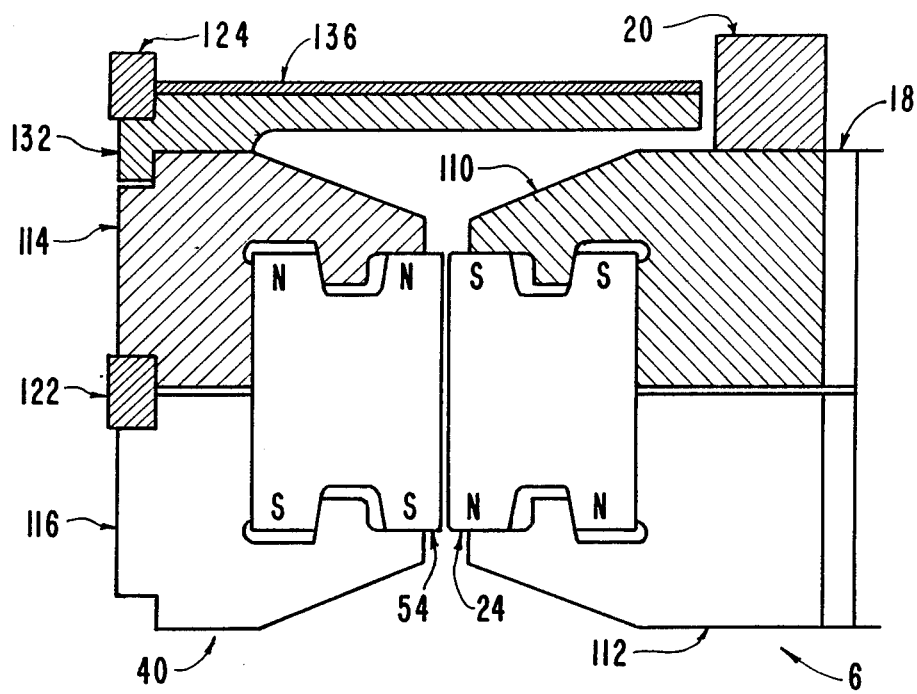
FIG. 5 is a cross-sectional view of the rotor 6 and stator 40 assemblies.

FIG. 5 is a cross-sectional view through a portion of the stator 40 and the rotor 6 assemblies. The rotor assembly 6 includes an upper section 110 and a lower section 112 held together by, for example, nuts and bolts or screws (not shown). The rotor coupler 20 can also be held to the upper rotor section 110 by screws by ball bearings on the shaft 18. The two sections 110 and 112 of the rotor cylinder 16 hold the permanent magnets 24 of the rotor. The stator assembly 40 holding the permanent magnets 54 also includes an upper section 114 and a lower section 116 held together by, for example, nuts and bolts or screws (not shown).

Figure 6:
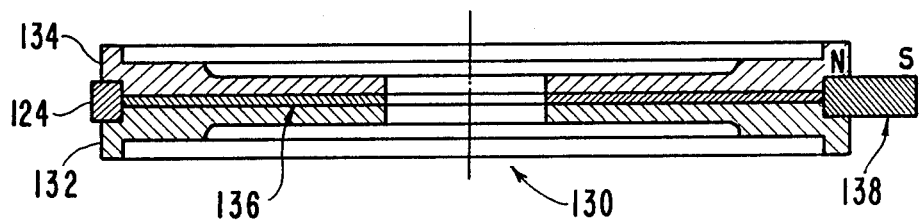
FIG. 6 is a separator assembly 130.
Figure 7:
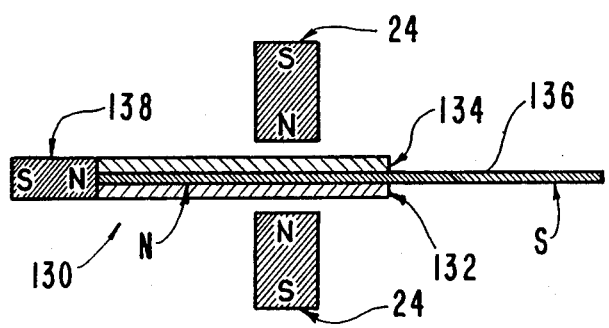
FIG. 7 depicts rotor magnet 24 and separator 130 orientation.

FIG. 6 illustrates a separator plate assembly 130 for separating adjacent stator assemblies 40 and rotor assemblies 6 from each other in a plural segment motor. The separator assembly 130 includes non-magnetic plates 132 and 134 made from a material such as aluminum. Between the plates 132 and 134 is a magnetic deflector 136 made from a material such as silicon iron or pure iron. The horizontal deflector 136 is biased by a permanent magnet made of samarium cobalt and magnetically oriented, as illustrated in FIG. 6, and performs the same function as the plate 12 of FIG. 1. FIG. 7 illustrates the separator assembly 130 in association with rotor magnets 24 and depicts the polarization created by magnet 138.

The magnetic switch 66 detects the presence of the spinning rotor when the rotor has rotated 87°15' past segment 48. A timing device is necessary to reverse the polarization of the electromagnets 56 and 58 for 32°25'. This timing device can be constructed from a multivibrator that holds the plurality of the electromagnets for the required length of time or by the addition of a second magnetic switch to detect the additional angular rotation. Any timing device that will reverse the electromagnetic polarity for the required amount of time is acceptable. If the reversal of the polarity is maintained for longer than 32°25' a reduction in motor speed will occur.

Figure 8:
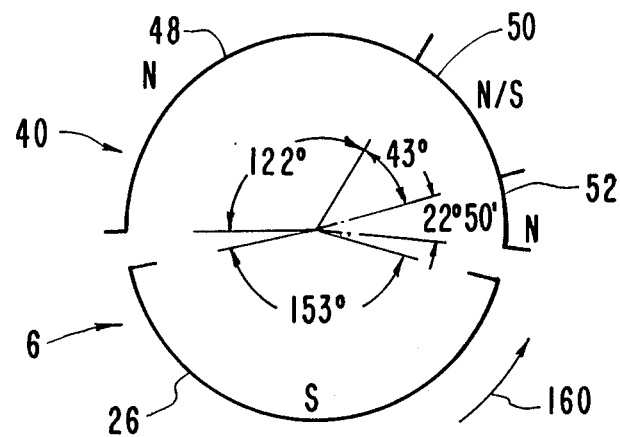
FIG. 8 is a schematic of field relationships in the present invention.
Figure 9:
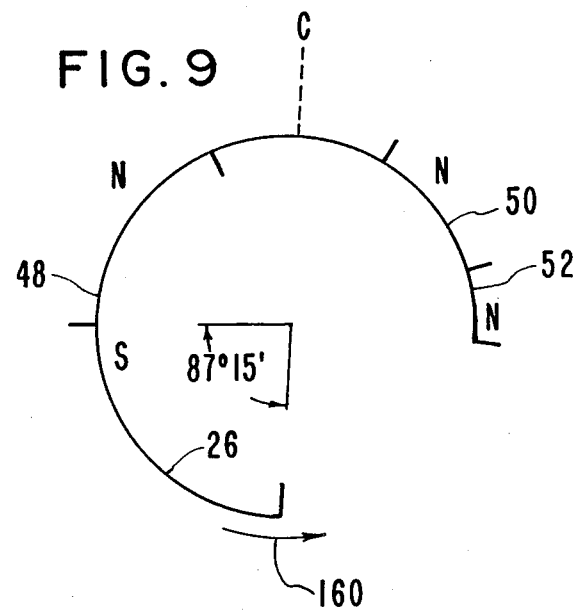
FIGS. 9 and 10 illustrate rotor position when the orientation of the stator field is shifted.
Figure 10:
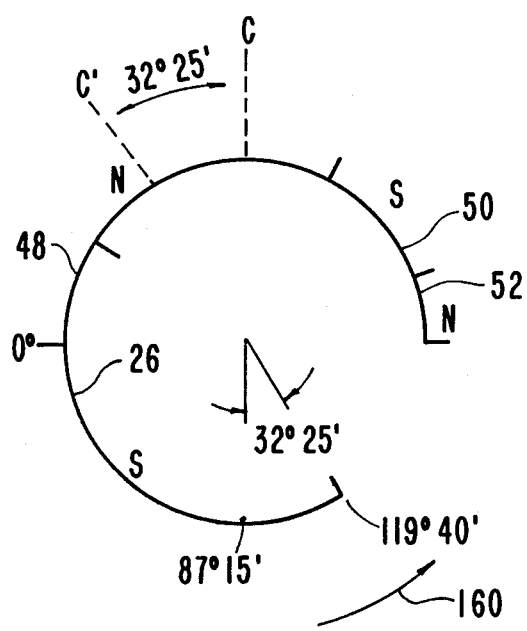

FIG. 8 illustrates the relationship of the various magnet and coil segments of the rotor assembly 6 and stator assembly 40 as seen from above. The first segment 48 of the stator occupies 122°, the third segment of the stator 52 occupies 22°50' and the electromagnet segment 50 in which the field orientation can be changed occupies 43°. The segment 26 of the rotor assembly 6 that includes permanent magnets 24 occupies an angle of 153°. The rotational direction 160 of the rotor 6 is counterclockwise as depicted. The motor in accordance with the present invention must be started rotating and must include some type of conventional starter assembly such as found in an automobile. FIGS. 9 and 10 will be used to describe the switching control performed by the switch 66 during rotation of the rotor.

As the rotor assembly 6 rotates and the first magnet 24 of the rotor segment 26 reaches a position 87°15′, in a counterclockwise direction past the last magnet 54 in the first segment 48. At this point in the cycle control switch 66 closes and the coils 56 and 58 produce a magnetic field with a polarity that matches the polarity of the stator permanent magnet segments 48 and 52 as illustrated in FIG. 9. This polarity of the electromagnets is maintained for 32°25′. The rotor 26 is attracted to the center C of the magnetic field created by the stator. When the rotor 26 has rotated the 32°25′ or the 119°40′ past the segment 48, the polarity of the electromagnets 56 and 58 is reversed (does not match the polarity of permanent segments 48 and 52) as illustrated in FIG. 10. This results in the shifting of the center of the stator field by approximately 32°25′ to the point C′. The rotor 26 is then attracted to the new center or equator C′. The rotor then experiences a power stroke of 122°. The reversed polarity is maintained until the rotor again reaches a point 87°15′ past the segment 48 as depicted in FIG. 9. The polarity of the electromagnets is changed twice during each rotation.

Figure 11:
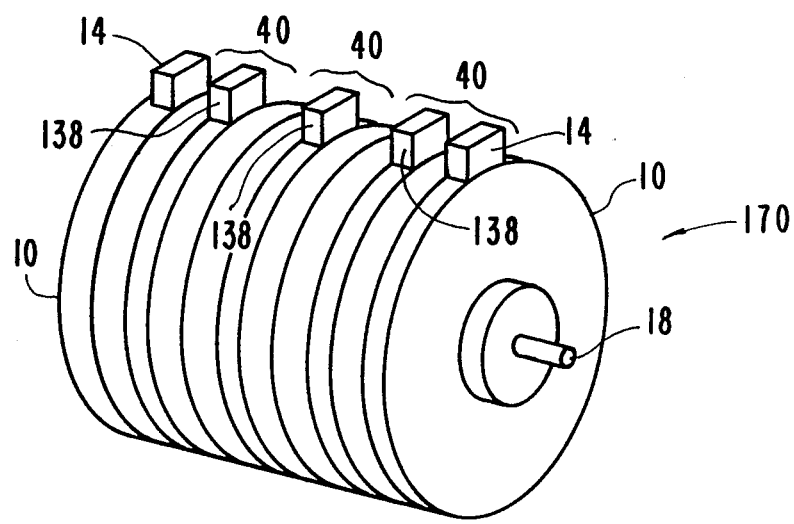
FIG. 11 depicts a triple segment motor 170.

The power stroke of one segment of a motor according to the present invention is approximately 122° and if continual, full thrust torque is desired a three segment motor 120° apart or offset is necessary. FIG. 11 illustrates a three segment motor 170 having first through third abutting stator assemblies and corresponding rotor assemblies in segments 40. The three segments 40 are held together using end plates 10 and each segment 40 includes a magnet 138 for polarizing each segment as discussed with respect to FIG. 7. A two segment motor with a diameter of approximately 7 inches provided with a current of 0.6 amps at 24 volts thereby requiring an input of 14 watts will produce a maximum speed of 2150 rpm when non-rare-earth magnets are used along with satisfactory torque. Rare earth magnets will provide additional speed and torque. One of the advantages of the present invention is the low amount of heat produced by the coils 56 and 58.

The many features and advantages of the present invention are apparent from the detailed specification and thus it is intended by the appended claims to cover all such features and advantages of the invention which fall within the true spirit and scope thereof. Further, since numerous modifications and changes will readily occur to those skilled in the art it is not desired to limit the invention to the exact construction and operation illustrated and described, and accordingly all suitable modifications and equivalents may be resorted to, falling within the scope of the invention.

I claim:

1. A motor, comprising:
   a stator assembly, including:
      a first segment having permanent magnets;
      a second segment being a coil segment and including an electromagnet adjacent and abutting said first segment; and
      a third segment having permanent magnets adjacent and abutting said second segment, and said first through third segments occupying less than the entire circumference of said stator assembly; and
   a rotor assembly rotating in said stator assembly and including a single rotor segment having permanent magnets occupying less than one-half of the circumference of the rotor assembly.

2. A motor comprising:
   a stator assembly, including:
      a first segment having permanent magnets;
      a second segment being a coil segment and including an electromagnet adjacent said first segment; and
      a third segment having permanent magnets adjacent said second segment, and said first through third segments occupying less than the entire circumference of said stator assembly; and
   a rotor assembly rotating in said stator assembly and including a rotor segment having permanent magnets occupying less than one-half the circumference of the rotor assembly, and said first segment subtending an angle of 122°, said second segment an angle of 43°, said third segment an angle of 22°50′ and said rotor segment an angle of 153°.

3. A motor as recited in claim 2, further comprising a magnetic cycle switch connected to said electromagnet and switching the polarity of the electromagnet when the leading edge of the rotor segment rotates past said first segment in the counterclockwise direction by 87°15′ and by 119°40′, switching a center of the stator magnetic field.

4. A motor as recited in claim 3, wherein said stator assembly further comprises a flux terminator adjacent said first segment.

5. A motor as recited in claim 4, further comprising a magnetically polarized end plate.

6. A motor as recited in claim 5, further comprising a polarized magnetic flux detector on the outside of said stator assembly.

7. A motor as recited in claim 1, wherein said stator has a magnetic field center and the center is shifted by reversing a polarity of said coil segment, the center being shifted 32°25′ and a flux produced by said second segment is 2.373% of a total flux produced by said first, second and rotor segments.

8. A motor, comprising:
   first through third abutting stator assemblies offset by 120° from each other in a direction of motor rotation, each stator assembly including:
      a first segment having permanent magnets;
      a second segment being a coil segment and including an electromagnet adjacent and abutting said first segment; and
      a third segment of permanent magnets adjacent and abutting said second segment, and said first through third segments occupying less than the entire circumference of said stator assembly; and
   first through third connector rotor assemblies, each rotor assembly including:
      a rotor rotating in a respective stator assembly and including a single rotor segment having permanent magnets occupying less than one-half the circumference of the rotor assembly, thereby providing torque during a full motor rotation.

* * * * *